UNITED STATES PATENT OFFICE.

JAMES SCOTT, OF ALLEGHENY CITY, PENNSYLVANIA.

PAVING-BRICK.

SPECIFICATION forming part of Letters Patent No. 361,329, dated April 19, 1887.

Application filed June 24, 1886. Serial No. 206,153. (No specimens.)

*To all whom it may concern:*

Be it known that I, JAMES SCOTT, of Allegheny City, in the county of Allegheny and State of Pennsylvania, have invented a new and useful Improvement in Paving-Bricks; and I do hereby declare the following to be a full, clear, and exact description thereof.

The object of my invention is the production of a hard, tenacious, non-absorbent brick or tile for paving purposes, and particularly for use on roadways. It is essential to the endurance of such bricks that they should not only be hard enough to resist the abrasion of traffic and tenacious enough not to crack, break, or crumble under the heavy weights, strains, and blows to which they are exposed, but also that they should be practically non-absorbent or impervious to moisture, because otherwise they would be much more liable to be injuriously affected by changes of temperature and in freezing weather to be split, broken, or disintegrated by the frost.

After careful experiments I have discovered a composition which practical use has demonstrated possesses the aforenamed qualities to an eminent degree.

I make a batch of mixture composed of one-third of yellow or common brick-clay, one-third of upland or dense clay, and one-third of fire-clay. These ingredients are properly ground together and mixed with water in the usual way to the proper degree of plasticity, and then molded into bricks of the desired shape. These bricks are dried in the usual way, and are then baked or fired by a prolonged exposure to a very high temperature in the usual tight kiln until they are perfectly vitrified throughout. The composition of different clays enables the brick to withstand the high heat without melting, while it becomes sufficiently fluxed throughout to produce a hard, vitreous, tenacious, non-absorbent body.

The proportions of the several ingredients may be varied somewhat and still obtain substantially the same result.

Analyses of the clays used by me show the following compositions, viz: The alluvial clay—silica, 73.21 per cent.; alumina, 11.21 per cent.; oxide of iron, 5.86 per cent. The upland or dense clay—silica, 57.75 per cent.; alumina, 25.42 per cent.; oxide of iron, 4.01 per cent. The fire-clay—silica, 52.19 per cent.; alumina, 16.76 per cent.; oxide of iron, 5.77 per cent. These percentages will vary somewhat in different localities; but the varieties or grades of brick-clays named and used by me are well known, and their combination as and in the proportions named by me will produce the superior paving-brick described by me, which combines the better features of the common paving-brick with those of the fire-brick and omits the defects of each.

These bricks are to be laid in any desired way; but I prefer to lay them on edge, bedded on a plank, board, or cement floor.

I am aware that ornamental tile have been formed by mixing two or more different clays, that will burn different colors, so that the clays will not blend into a homogeneous mass; but these differ from my improved brick in that in the latter there is a blending of the several ingredients, caused by the mixing and the effects of the heat.

What I claim as my invention, and desire to secure by Letters Patent, is—

A paving-brick composed of alluvial clay, upland or dense clay, and fire-clay ground, mixed, and baked together in substantially equal proportions, as and for the purposes described.

In testimony whereof I have hereunto set my hand this 6th day of April, A. D. 1886.

JAMES SCOTT.

Witnesses:
W. B. CORWIN,
J. K. SMITH.